United States Patent
Lee

(10) Patent No.: US 9,472,999 B1
(45) Date of Patent: Oct. 18, 2016

(54) DAMPER WITH LINEAR POWER GENERATION AND RELUCTANCE

(71) Applicant: CHI HUA FITNESS CO., LTD., Hsinchu County (TW)

(72) Inventor: Ying-Che Lee, Hsinchu County (TW)

(73) Assignee: Chi Hua Fitness Co., Ltd., Hsinchu County (TW)

( * ) Notice: Subject to any disclaimer, the term of this patent is extended or adjusted under 35 U.S.C. 154(b) by 42 days.

(21) Appl. No.: 14/667,830

(22) Filed: Mar. 25, 2015

(51) Int. Cl.
| | |
|---|---|
| F03G 7/08 | (2006.01) |
| H02K 7/18 | (2006.01) |
| H02K 7/06 | (2006.01) |

(52) U.S. Cl.
CPC .............. *H02K 7/1853* (2013.01); *H02K 7/06* (2013.01)

(58) Field of Classification Search
CPC ...... H02K 7/06; H02K 7/116; H02K 7/1853; F03G 2730/05; F03G 2730/06; F03G 5/00; F03G 5/08
USPC ....... 290/1 R, 1 C, 4 R, 4 C; 310/12, 14, 80; 322/3; 482/1, 5, 6, 81
See application file for complete search history.

(56) References Cited

U.S. PATENT DOCUMENTS

| | | | | |
|---|---|---|---|---|
| 4,765,613 A | * | 8/1988 | Voris .................. | A63B 21/0056 482/137 |
| RE34,959 E | * | 5/1995 | Potts .................... | A63B 21/157 482/52 |
| 5,542,893 A | * | 8/1996 | Petersen .............. | A63B 21/157 280/245 |
| 5,656,903 A | * | 8/1997 | Shui .......................... | B25J 3/04 318/568.1 |
| 7,190,096 B2 | * | 3/2007 | Blanding ................ | B64C 13/00 310/112 |
| 2006/0288816 A1 | * | 12/2006 | Baudendistel .......... | F16D 65/18 74/586 |

* cited by examiner

*Primary Examiner* — Tulsidas C Patel
*Assistant Examiner* — Thomas Quigley
(74) *Attorney, Agent, or Firm* — Rosenberg, Klein & Lee

(57) ABSTRACT

A damper with linear power generation and reluctance includes a tube body, a movable driving rod, and a generator whereby the driving rod displaces in linear movement in the tube body and drives a screw rod by a screw sleeve to connect and drive a driving mechanism to rotate a shaft of a generator thereof, rotating a rotor thereof and producing a torque by the electromagnetic loading from the operation of the magnet and group of coil as the buffer and damping force for the linear displacement. The present invention complements the defect of oil leakage in the prior art and produces reluctance by the generator thereof, producing the damping force in a short time and being able to keep the balance of the force, therefore featuring itself longer durability with high quality.

10 Claims, 9 Drawing Sheets

DAMPER WITH LINEAR POWER GENERATION AND RELUCTANCE

BACKGROUND OF THE INVENTION

1. Field of the Invention

The present invention relates to a damper, particularly to a non-hydraulic damper that turns linear displacement into the driving force for power generation and further produces reluctance by a generator.

2. Description of the Related Art

Among equipment for indoor sporting or rehabilitation, most of which need to have a loading device or a damping device for reciprocating movement in the operation, such as rowing fitness machines and machines for muscle training, to fulfill the training or rehabilitating purposes of the operators. FIG. 1A is a conventional fitness equipment with reciprocating movements 10. It has a handle bar 12 connected to a seating 11 by a damping device 13. Due to the restriction of space, the damping device 13 of such equipment usually comprises a hydraulic cylinder as shown in FIG. 1B. Such hydraulic cylinder mainly includes a piston 132 with a small passage 133 therein and a piston rod 134 arranged at an end in a cylinder 131, and the cylinder 131 has a pre-determined volume of hydraulic oil 135. When the piston rod 134 receives a force and displaces in linear movement inside the cylinder 131, the hydraulic oil 135 would flow through the small passage 133 to produce a damping force.

However, the rod of the damping device 13 with hydraulic oil would cause oil leakage due to frequent friction with a sealing section 136 thereof and therefore influence the damping function and stain the equipment and the floor. Moreover, the viscosity of the hydraulic oil may change and be affected by high temperature in long-term operation, causing instability in the damping function as well. Also, the hydraulic oil has to reciprocate through the small passage 133 of the piston 132 in accordance with the stretching or contracting of the piston rod 134, which may not be able to keep up with the switching of the direction in time, therefore failing to exert the functions of the equipment or machines.

SUMMARY OF THE INVENTION

A primary object of the present invention is to provide a non-hydraulic damper to conquer the problem of oil leakage in conventional hydraulic dampers.

Another object of the present invention is to ensure the non-hydraulic damper would react in a short period of time and provide a stably balanced damping force, so as to improve the application in fitness equipment.

To achieve the objects mentioned above, the present invention comprises a tube body having a first through hole at an end, a second through hole at the other end, and a first axial passage formed by the first and second through holes; a hollow driving rod having an inner end and an outer end as the outer end stretching outside the first through hole and having a first pivot portion and the inner end being able to displace inside the tube body, a second axial passage formed therein, and a third through hole connecting to the second axial passage at the inner end thereof; a screw sleeve arranged in the third through hole for moving with the driving rod in linear displacement; a screw rod having thread section thereon for screwing with the screw sleeve, and a shaft section stretching out from the second axial passage of the driving rod; a driving case having a bottom casing and a top casing which form a space therein with the bottom casing having a second pivot portion and the top casing having a second hole thereon, a flange arranged around the edge of the second hole for engaging the second through hole of the tube body, and a first hole arranged on the flange for engaging a first bearing, allowing the shaft section of the screw rod to pass through into the space and the screw rod to rotate; a generator having a shaft, a stator, and a rotor where the stator has a positioning portion and a group of coil with the seating of the positioning portion being engaged through the second hole for the group of coil to be fixed outside the top casing, and the positioning portion having a second bearing arranged therein for the shaft to pass through into the space, allowing which to rotate; and the rotor having a wheel and a magnet fixed therein, both engaging the shaft for the magnet to rotate around the group of coil of the stator so as to form a generator system; a driving mechanism having a driver and a driven element connected to the driver, both of which are disposed inside the space of the driving case where the driver is engaging to an end of the shaft section to be driven thereby and rotate, and the driven element is engaging to and end of the shaft to be driven thereby and rotate;

whereby the driving rod is moving in linear displacement along the first axial passage when the first and second pivot portion are driven, resulting in the screw sleeve driving the screw rod to rotate, then the driving mechanism driving the shaft and the rotor to rotate for the magnet and group of coil to produce a torque by the electromagnetic loading as the buffer and damping force for the linear displacement.

In an embodiment, the wheel of the generator is engaging the shaft with a unidirectional rotating part around the shaft so that the magnet can only rotate around the stator in single direction.

In addition, the driver of the driving mechanism is a driver pulley wheel and the driven element is a driven pulley wheel connected to the driver pulley wheel by a belt; and the driving mechanism further includes an idler pulley disposed inside the space to adjust the tension of the belt.

In the embodiment, the generator further includes a housing covering around the stator and the rotor, and a cover arranged at the outside end of the housing, at the center of which a third bearing is arranged for the shaft to pass through. The first through hole comprises a first axial sleeve mounted on the outer end of the tube body and the first axial sleeve has a bush arranged between the inner groove thereof and the edge of the driving rod.

In the embodiment, the first pivot portion is formed by an oil impregnated bearing or a circular tube engaging through the outer end of the driving rod perpendicularly; the bottom casing has a convex lug arranged on the outside, forming the second pivot portion by having an oil impregnated bearing or a circular tube engaging through perpendicularly.

Furthermore, the screw sleeve is a short piece fixed in the third through hole, or it could be formed in one-piece with the driving rod and arranged on the inner edge of the third through hole.

With structures disclosed above, the present invention produces a torque by the electromagnetic loading from the operation of the magnet and group of coil to replace the hydraulic structure, therefore effectively complements the defect of oil leakage in the conventional hydraulic structure. Also, the present invention has a smaller lead of the driving rod thereof so that it is able to actuate the generator in a short time, creating the reluctance and keeping a stably balanced damping force to improve the application in fitness equipment.

DETAILED DESCRIPTION OF THE PREFERRED EMBODIMENT

Figure 1A:
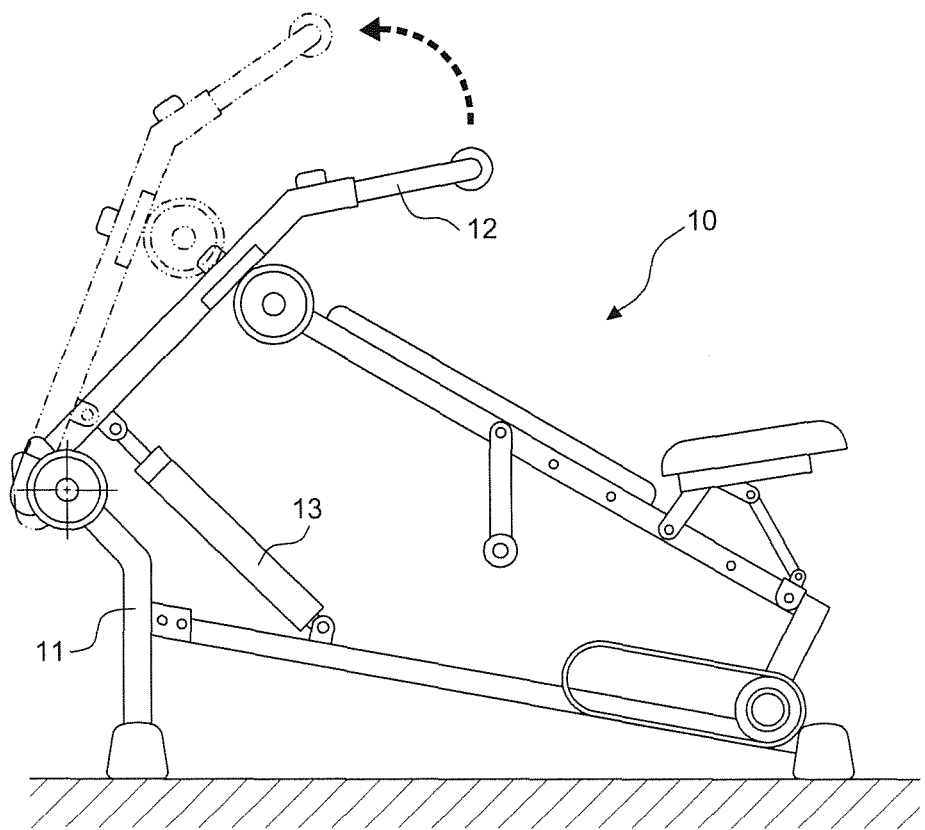
FIG. 1A is a schematic diagram of a conventional fitness equipment.
Figure 1B:
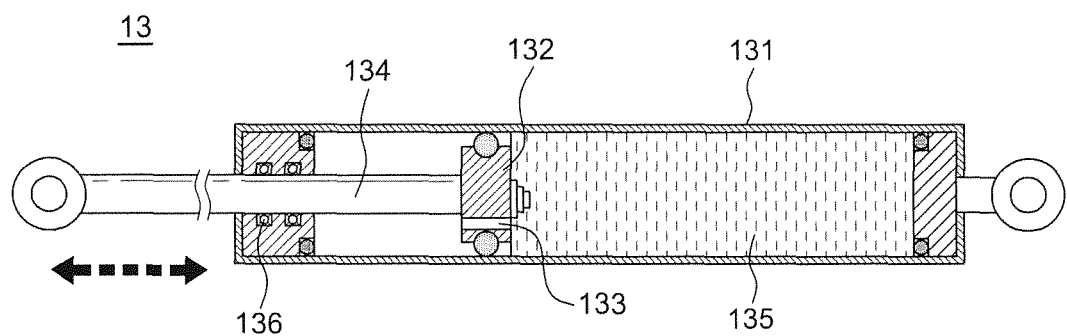
FIG. 1B is a sectional view of a conventional hydraulic damper.
Figure 2:
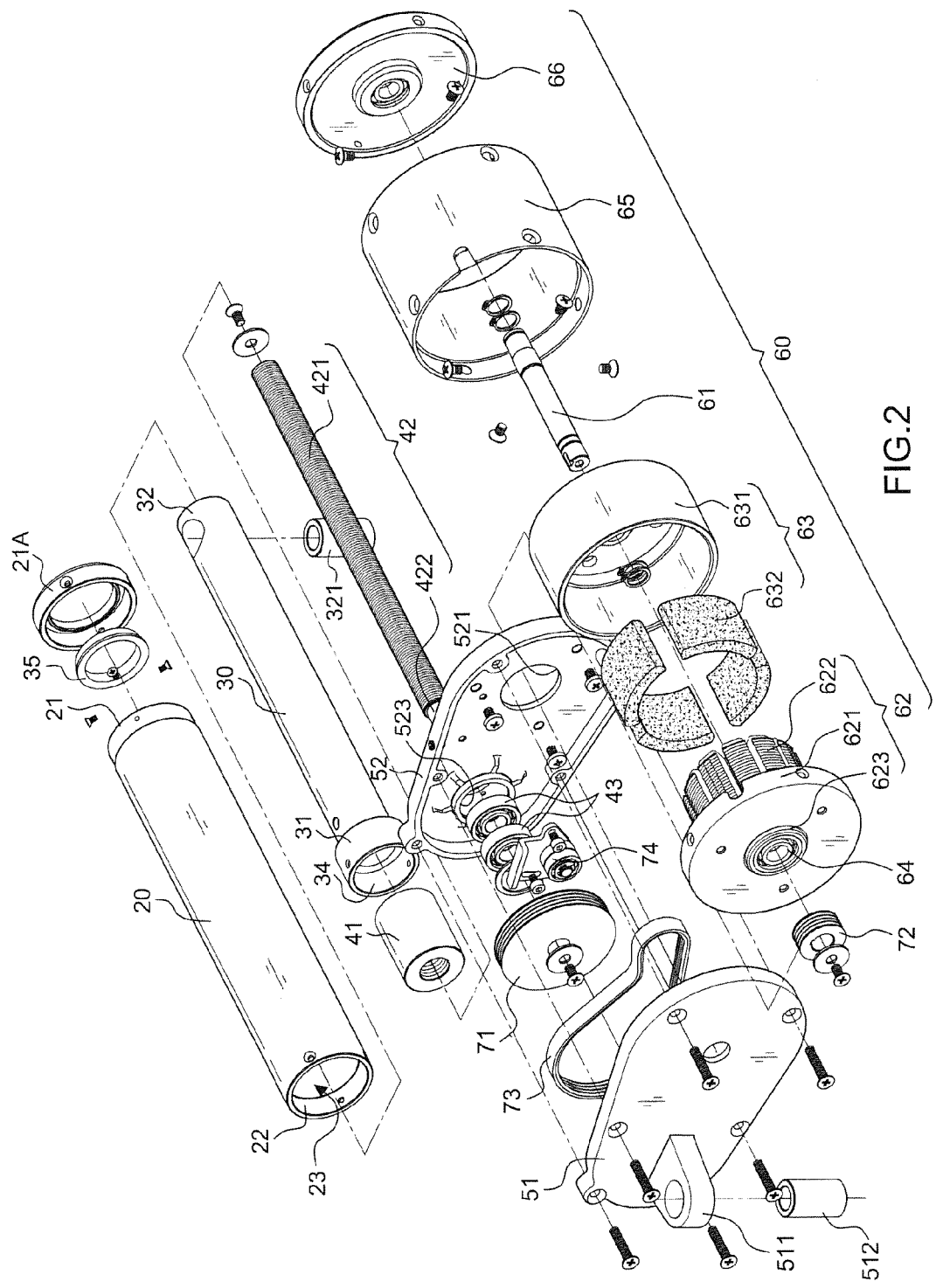
FIG. 2 is an exploded view of the present invention in a preferred embodiment.
Figure 3:
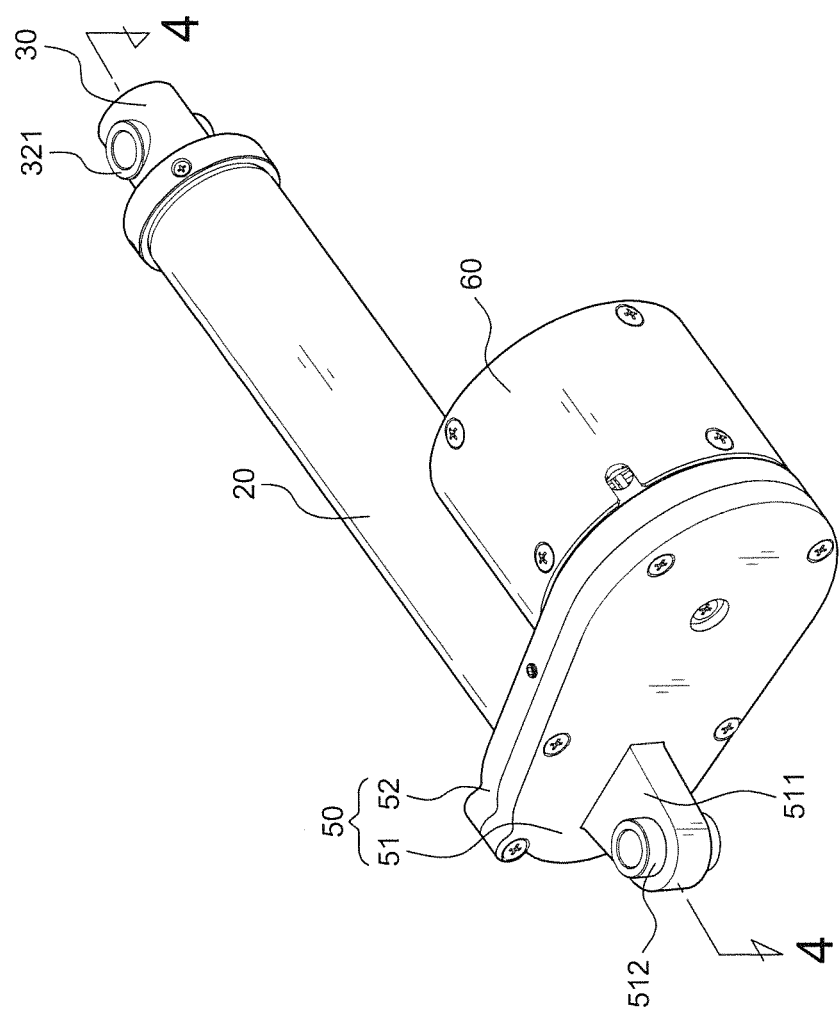
FIG. 3 is a perspective view of the present invention in a preferred embodiment.
Figure 4:
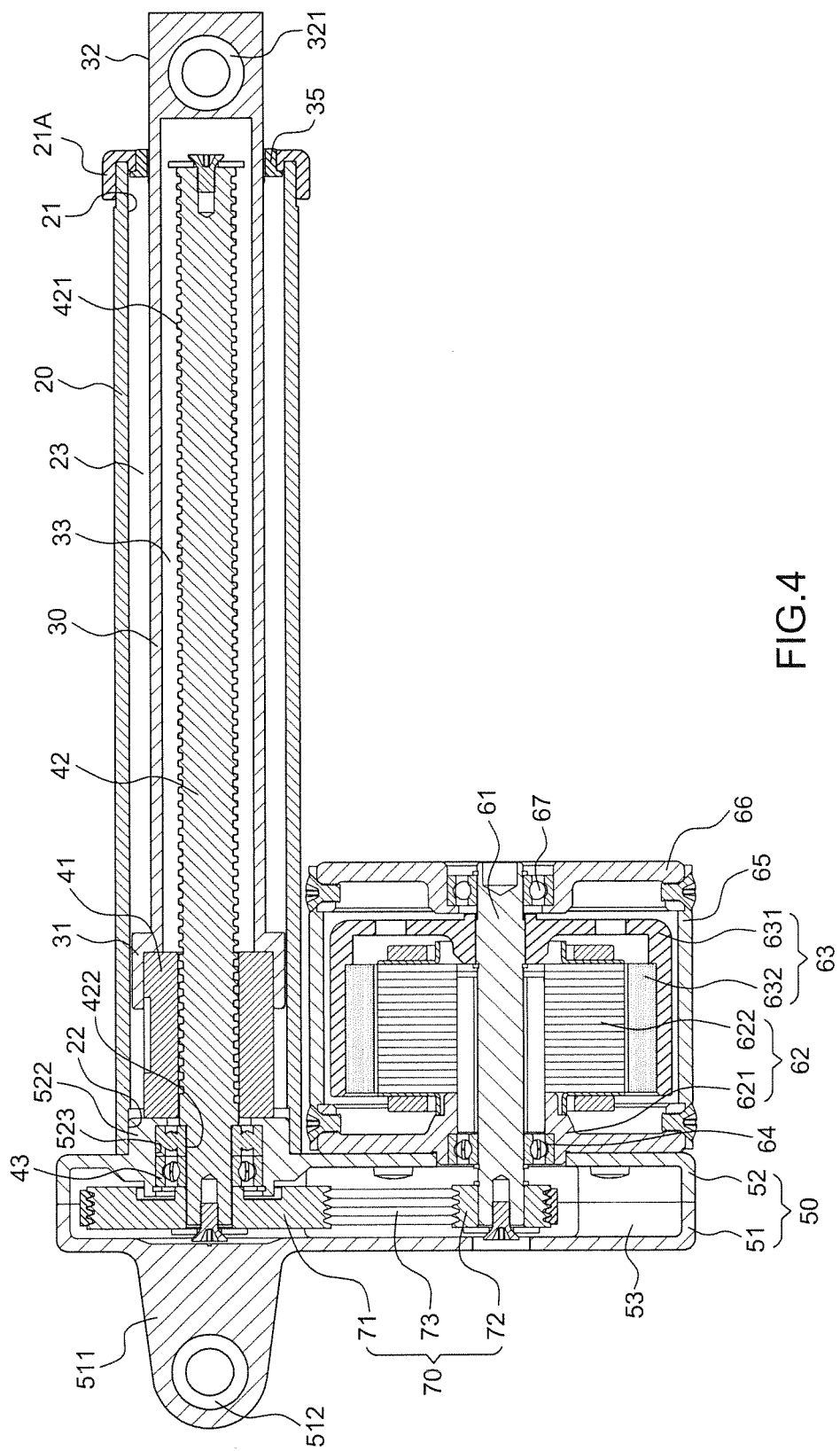
FIG. 4 is a sectional view of the present invention in a preferred embodiment.

Referring to FIGS. 2-4, a preferred embodiment of the present invention comprises a tube body 20, a driving rod 30, a screw sleeve 41, a screw rod 42, a driving case 50, a generator 60, a housing 65, a cover 66, a driving mechanism 70, and an idle pulley 74.

The tube body 20 has a first through hole 21 at an end, a second through hole 22 at the other end, and a first axial passage 23 formed by the first and second through holes 21, 22.

The driving rod 30 is hollow and has an inner end 31 and an outer end 32 as the former being able to displace inside the tube body 20 and the latter stretching outside the first through hole 21 with a first pivot portion 321—in this embodiment, an oil impregnated bearing or a circular tube engaging through the outer end 32 of the driving rod 30 perpendicularly—and a first axial sleeve 21A mounted thereon; the first axial sleeve 21A further has a bush 35 arranged between the inner groove thereof and the edge of the driving rod 30 to ensure a smooth displacement of the driving rod 30 during operation.

The hollow driving rod 30 further includes a second axial passage 33 formed therein, and a third through hole 34 connecting to the second axial passage 33 at the inner end 31 thereof. The screw sleeve 41 is arranged in the third through hole 34 for moving with the driving rod 30 in linear displacement. In this embodiment, the screw sleeve 41 can be arranged as a short piece fixed in the third through hole 34, and the inner end 31 has a longer diameter for engaging the screw sleeve 41; or the screw sleeve 41 is formed in one-piece with the driving rod 30 and arranged on the inner edge of the third through hole 34 in another applicable embodiment.

The screw rod 42 has thread section 421 thereon for screwing with the screw sleeve 41, and a shaft section 422 stretching out from the second axial passage 33 of the driving rod 30.

The driving case 50 has a bottom casing 51 and a top casing 52 to form a space 53 therein by screws. The bottom casing 51 has a convex lug 511 arranged on the outside and a second pivot portion 512 engaging through the convex lug 511 perpendicularly; in this embodiment, the second pivot portion 512 is an oil impregnated bearing or a circular tube. The top casing 52 has a second hole 521 thereon, a flange 522 arranged around the edge of the second hole 521 to engage the second through hole 22 of the tube body 20 for fixing the tube body 20 outside the top casing 52, and a first hole 523 arranged on the center of the flange 522 for engaging a first bearing 43, allowing the shaft section 422 of the screw rod 42 to pass through into the space 53 and the screw rod 42 to rotate.

The generator 60 has a shaft 61, a stator 62, and a rotor 63. The stator 62 has a positioning portion 621 and a group of coil 622; the seating 623 of the positioning portion 621 is engaged through the second hole 521 and the positioning portion 621 is fixed on the top casing 52 by screws for the group of coil 622 to be fixed in position as well. A second bearing 64 is arranged along the inner edge of the seating 623 for the shaft 61 to pass through into the space 53, allowing which to rotate. The rotor 63 has a wheel 631 and a magnet 632 fixed inside the wheel 631, engaging the shaft 61 for the magnet 632 to rotate around the group of coil 622 of the stator 62 so as to form a generator system. The housing 65 is covering around the stator 62 and the rotor 63 and fixed on the positioning portion 621 of the stator 62. The cover 66 is arranged at the outside end of the housing 65 and fixed by screws, at the center of which a third bearing 67 is arranged for the shaft 61 to pass through and rotate during operation.

The driving mechanism 70 has a driver 71 and a driven element 72 connected to the driver 71, both of which are disposed inside the space 53 of the driving case 50; in this embodiment, the driver 71 is a driver pulley wheel and the driven element 72 is a driven pulley wheel connected to the driver pulley wheel by a belt 73. The driver pulley wheel 71 is engaging to an end of the shaft section 422 by screws to be driven thereby and rotate, and the driven pulley wheel 72 is engaging to and end of the shaft 61 by screws to be driven thereby and rotate. The idler pulley 74 is disposed in the space 53 to adjust the tension of the belt 73.

Whereby the driving rod 30 is moving in linear displacement along the first axial passage 23 when the first and second pivot portion 321, 512 are driven, resulting in the displacement of the screw sleeve 41 that drives the screw rod 42 to rotate and the driver pulley wheel 71 and the driven pulley wheel 72 are driven as well; then the driving mechanism 70 drives the shaft 61 and the rotor 63 to rotate for the magnet 632 and group of coil 622 to produce a torque by the electromagnetic loading as the buffer and damping force for the linear displacement.

The damper with the reluctance disclosed above has an electromagnetic resistance formed by the changes in the magnetic field. Basically it produces a reversed electromagnetic torque by putting a conductor in a magnetic field and moving it within the field, creating a counter electromotive force and therefore the reversed electromagnetic torque. Further, according to Maxwell's Equation, the intensity of the magnetic force is in direct proportion to the magnitude of the torque force, and the torque force can be the buffer or damping load in fitness equipment.

Figure 5:
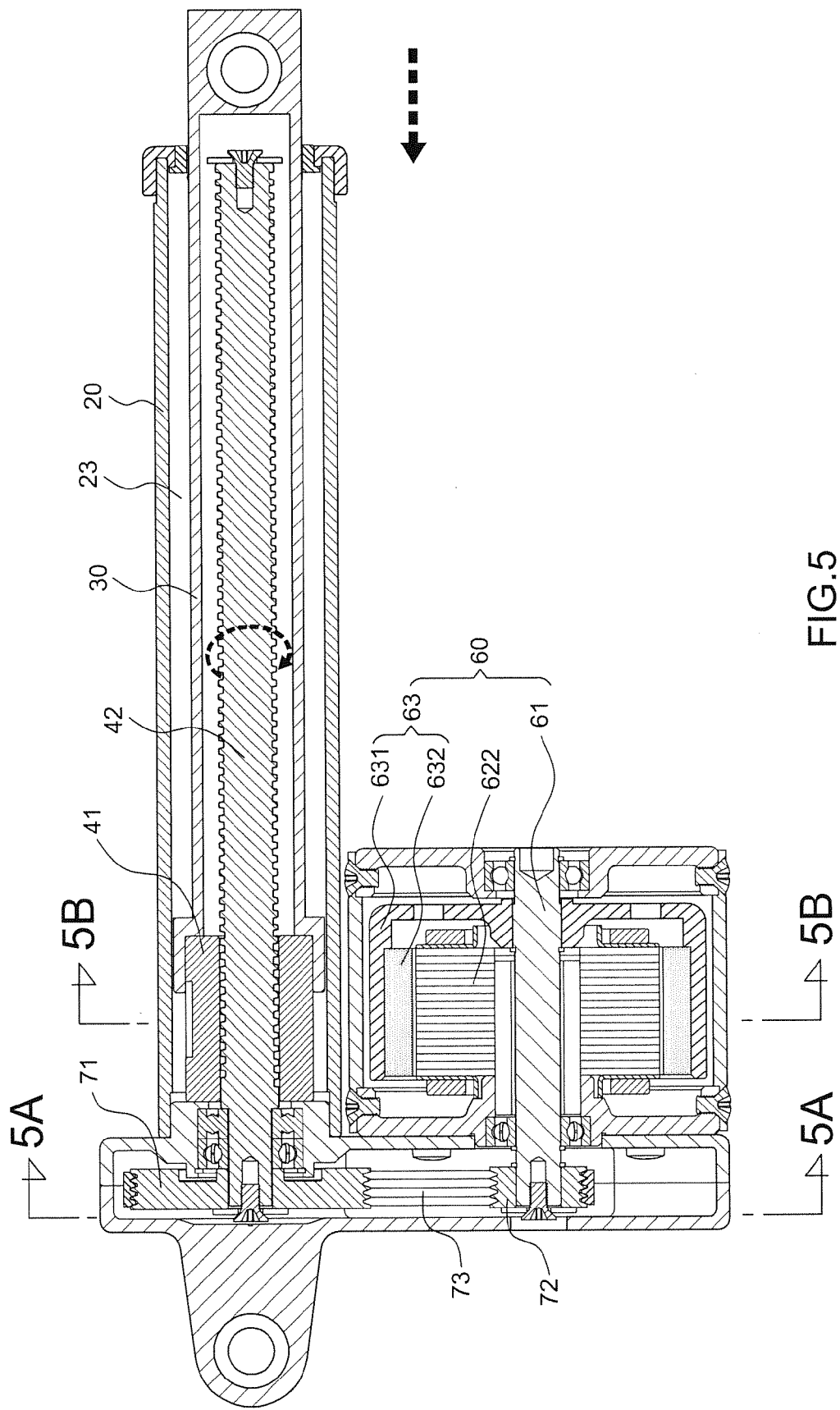
FIG. 5 is a sectional view of the present invention in linear displacement of contraction.
Figure 5A:
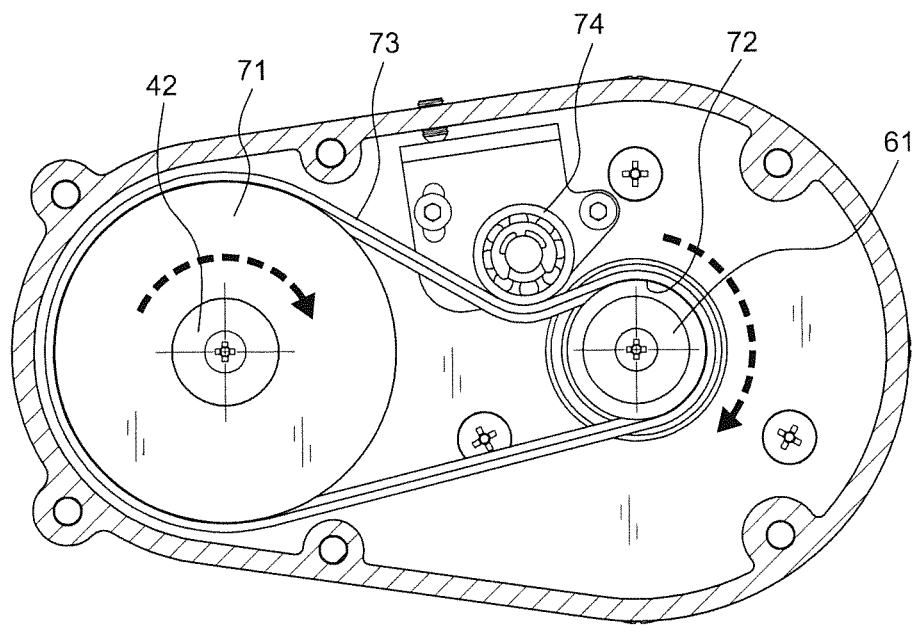
FIG. 5A is a sectional view along line 5A-5A in FIG. 5.
Figure 5B:
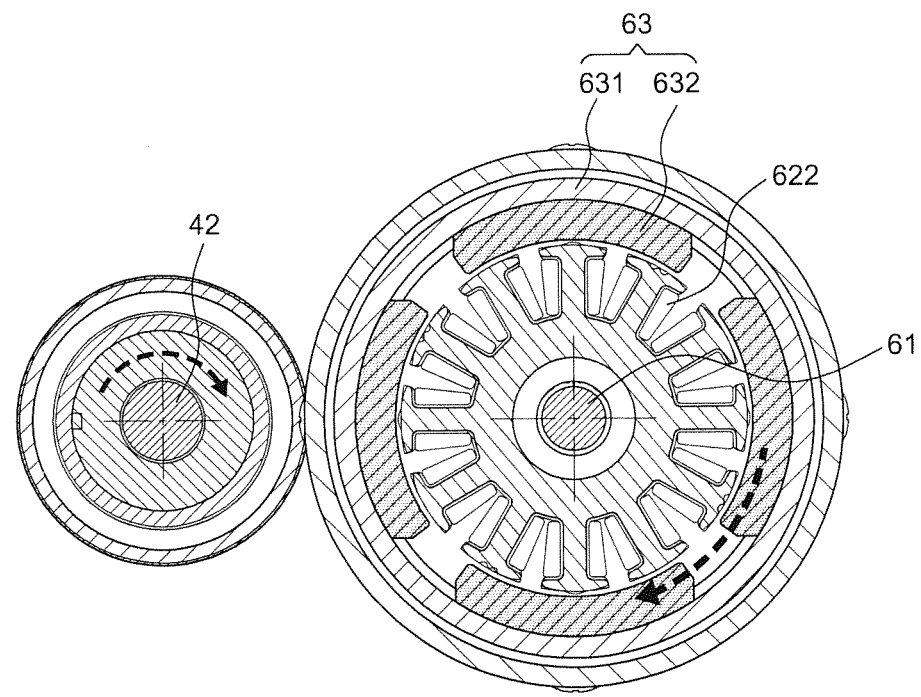
FIG. 5B is a sectional view along line 5B-5B in FIG. 5.

FIGS. 5, 5A and 5B are sectional views of the present invention illustrating the driving rod 30 receiving a pushing force and contracting in linear displacement along the first axial passage 23 of the tube body 20. The screw rod 42 is driven to rotate by the screw sleeve 41, driving the driver pulley wheel 71 to rotate clockwise (or counter clockwise)

and drive the driven pulley wheel 72 via the belt 73, then actuating the generator 60 by the shaft 61 to rotate the rotor 63.

Figure 6:
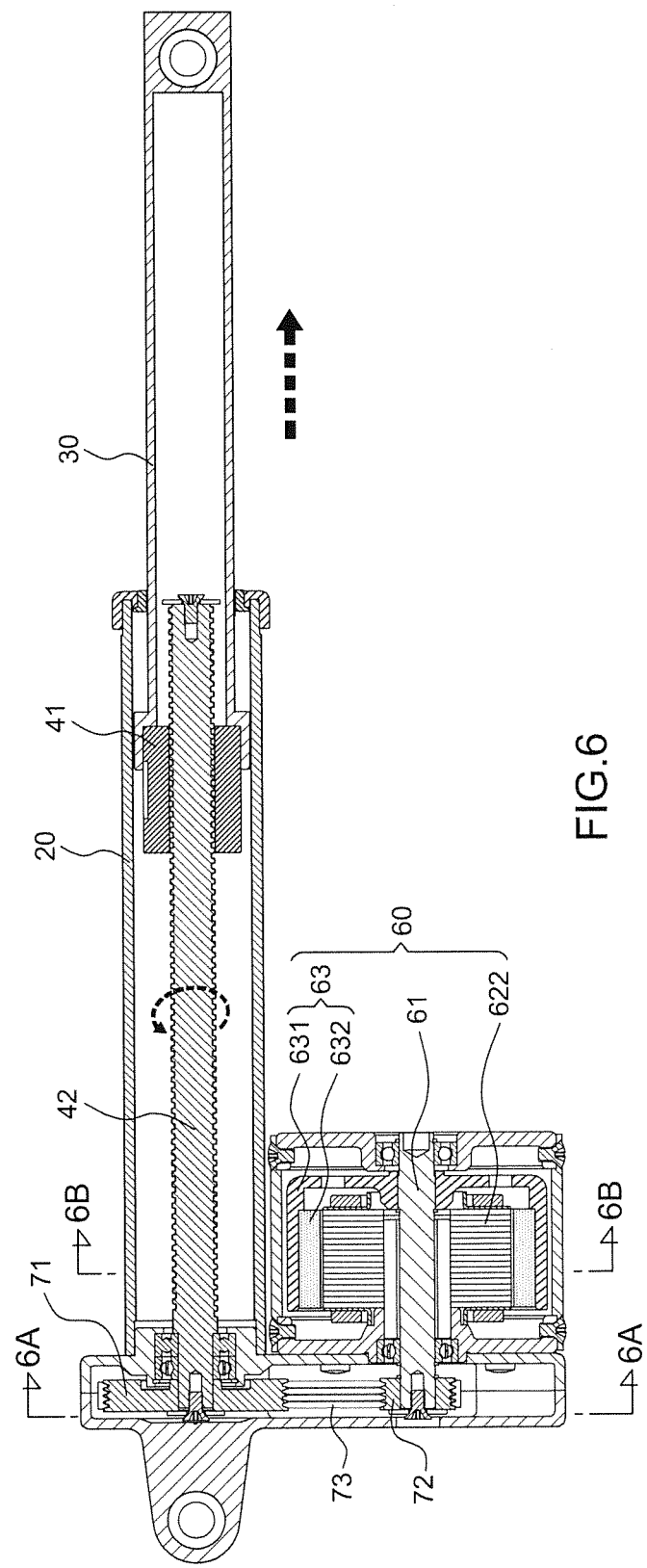
FIG. 6 is a sectional view of the present invention in linear displacement of stretching.
Figure 6A:
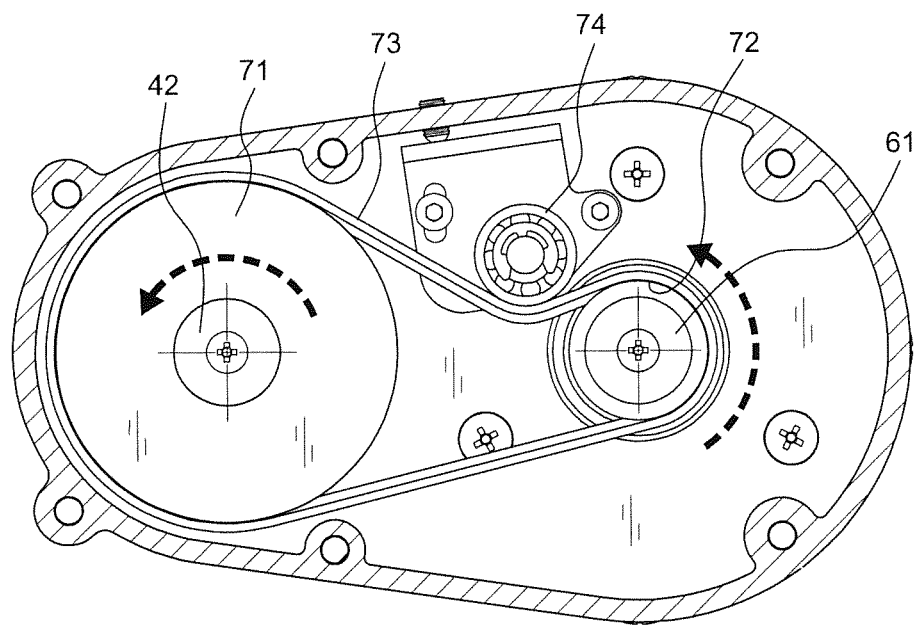
FIG. 6A is a sectional view along line 6A-6A in FIG. 6.
Figure 6B:
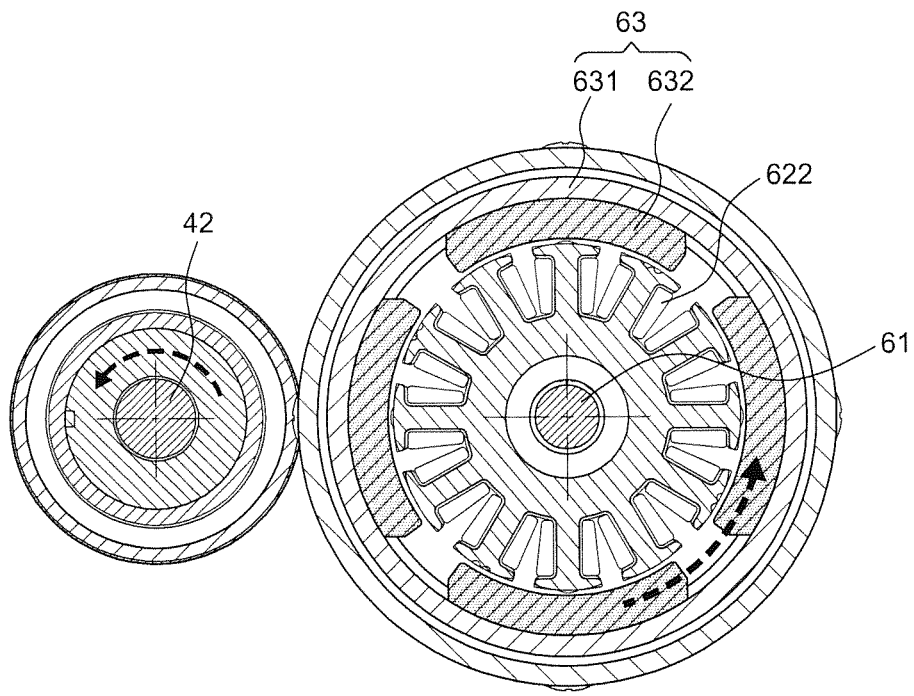
FIG. 6B is a sectional view along line 6B-6B in FIG. 6.

FIGS. 6, 6A and 6B are sectional views of the present invention illustrating the driving rod 30 receiving a pushing force and stretching out the first axial passage 23 of the tube body 20 in linear displacement. The screw rod 42 is driven to rotate by the outwards displacing screw sleeve 41, driving the driver pulley wheel 71 to rotate counter clockwise (or clockwise) and drive the driven pulley wheel 72 via the belt 73, then actuating the generator 60 by the shaft 61 to rotate the rotor 63.

Figure 7:
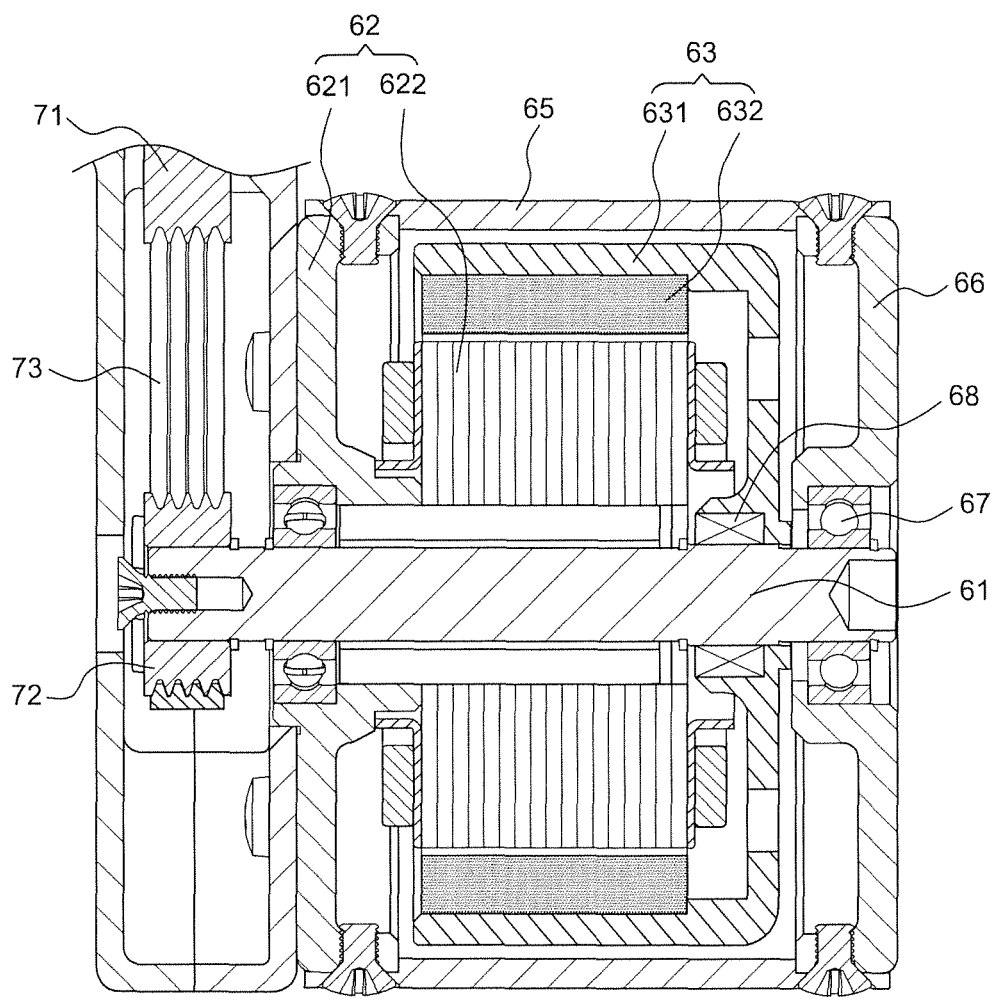
FIG. 7 is a sectional view of the generator of the present invention in another embodiment.

FIG. 7 is another embodiment of the present invention. In the embodiment, the wheel 631 has a unidirectional rotating part 68 engaging the shaft 61 so that the wheel 631 would drive the magnet 632 to rotate around the stator 62 in single direction. In this embodiment, the unidirectional rotating part 68 is a unidirectional bearing, but it is not limited to such application.

The present invention has the driving rod 30 thereof stretching and contracting in linear displacement to create the electromagnetic loading by the operation of the magnet 632 and group of coil 622 and produce a torque. The damping force created by the reluctance does not need the hydraulic oil structure as in the prior art, avoiding the problem of oil leakage. Additionally, the present invention has a smaller lead of the driving rod 30 so that the driving rod 30 is able to actuate the generator 60 in a short time, creating the reluctance and keeping a stably balanced damping force to improve the application in fitness equipment.

Although particular embodiments of the invention have been described in detail for purposes of illustration, various modifications and enhancements may be made without departing from the spirit and scope of the invention. Accordingly, the invention is not to be limited except by the appended claims.

What is claimed is:

1. A damper with linear power generation and reluctance, comprising:
a tube body having a first through hole at an end, a second through hole at the other end, and a first axial passage formed by the first and second through holes;
a hollow driving rod having an inner end and an outer end as the outer end stretching outside the first through hole and having a first pivot portion and the inner end being able to displace inside the tube body, a second axial passage formed therein, and a third through hole connecting to the second axial passage at the inner end thereof;
a screw sleeve arranged in the third through hole for moving with the driving rod in linear displacement;
a screw rod having thread section thereon for screwing with the screw sleeve, and a shaft section stretching out from the second axial passage of the driving rod;
a driving case having a bottom casing and a top casing which form a space therein with the bottom casing having a second pivot portion and the top casing having a second hole thereon, a flange arranged around the edge of the second hole for engaging the second through hole of the tube body, and a first hole arranged on the flange for engaging a first bearing, allowing the shaft section of the screw rod to pass through into the space and the screw rod to rotate;
a generator having a shaft, a stator, and a rotor where the stator has a positioning portion and a group of coil with the seating of the positioning portion being engaged through the second hole for the group of coil to be fixed outside the top casing, and the positioning portion having a second bearing arranged therein for the shaft to pass through into the space, allowing which to rotate; and the rotor having a wheel and a magnet fixed therein, both engaging the shaft for the magnet to rotate around the group of coil of the stator so as to form a generator system;
a driving mechanism having a driver and a driven element connected to the driver, both of which are disposed inside the space of the driving case where the driver is engaging to an end of the shaft section to be driven thereby and rotate, and the driven element is engaging to and end of the shaft to be driven thereby and rotate;
whereby the driving rod is moving in linear displacement along the first axial passage when the first and second pivot portion are driven, resulting in the screw sleeve driving the screw rod to rotate, then the driving mechanism driving the shaft and the rotor to rotate for the magnet and group of coil to produce a torque by the electromagnetic loading as the buffer and damping force for the linear displacement.

2. The damper with linear power generation and reluctance as claimed in claim 1, wherein the wheel of the generator is engaging the shaft with a unidirectional rotating part around the shaft so that the magnet can only rotate around the stator in single direction.

3. The damper with linear power generation and reluctance as claimed in claim 1, wherein the driver of the driving mechanism is a driver pulley wheel and the driven element is a driven pulley wheel connected to the driver pulley wheel by a belt.

4. The damper with linear power generation and reluctance as claimed in claim 3, wherein the driving mechanism further includes an idler pulley disposed inside the space to adjust the tension of the belt.

5. The damper with linear power generation and reluctance as claimed in claim 1, wherein the generator further includes a housing covering around the stator and the rotor, and a cover arranged at the outside end of the housing, at the center of which a third bearing is arranged for the shaft to pass through.

6. The damper with linear power generation and reluctance as claimed in claim 1, wherein the first through hole comprises a first axial sleeve mounted on the outer end of the tube body and the first axial sleeve has a bush arranged between the inner groove thereof and the edge of the driving rod.

7. The damper with linear power generation and reluctance as claimed in claim 1, wherein the first pivot portion is formed by an oil impregnated bearing or a circular tube engaging through the outer end of the driving rod perpendicularly.

8. The damper with linear power generation and reluctance as claimed in claim 1, wherein the bottom casing has a convex lug arranged on the outside, forming the second pivot portion by having an oil impregnated bearing or a circular tube engaging through perpendicularly.

9. The damper with linear power generation and reluctance as claimed in claim 1, wherein the screw sleeve is a short piece fixed in the third through hole.

10. The damper with linear power generation and reluctance as claimed in claim 1, wherein the screw sleeve is formed in one-piece with the driving rod and arranged on the inner edge of the third through hole.

* * * * *